United States Patent
Glueck et al.

(10) Patent No.: US 8,996,242 B2
(45) Date of Patent: Mar. 31, 2015

(54) AIRBAG DATA EXCHANGE SYSTEM

(71) Applicant: Zodiac Cabin Controls GmbH, Hamburg (DE)

(72) Inventors: Susanne Glueck, Quickborn (DE); Martin Tischmann, Hamburg (DE); Jeroen Willem Kurvink, Hamburg (DE); Christian Dieling, Hamburg (DE)

(73) Assignee: Zodiac Cabin Controls GmbH, Hamburg (DE)

( * ) Notice: Subject to any disclaimer, the term of this patent is extended or adjusted under 35 U.S.C. 154(b) by 0 days.

(21) Appl. No.: 13/753,934

(22) Filed: Jan. 30, 2013

(65) Prior Publication Data

US 2013/0197746 A1 Aug. 1, 2013

Related U.S. Application Data

(60) Provisional application No. 61/592,031, filed on Jan. 30, 2012.

(51) Int. Cl.
*B60R 21/017* (2006.01)
*B64D 25/00* (2006.01)
(Continued)

(52) U.S. Cl.
CPC .............. *G06F 17/00* (2013.01); *B60R 21/017* (2013.01); *B60R 21/0173* (2013.01); *B60R 2021/0093* (2013.01); *B64D 2011/061* (2013.01)
USPC ........... 701/34.4; 701/45; 701/31.5; 701/33.2

(58) Field of Classification Search
CPC ................... B60R 2021/0093; B60R 21/0173; B64D 2201/00; G06F 17/00
See application file for complete search history.

(56) References Cited

U.S. PATENT DOCUMENTS 6,608,551 B1 * 8/2003 Anderson et al. .......... 340/10.51
2002/0050826 A1 5/2002 Boran et al.
(Continued)

FOREIGN PATENT DOCUMENTS

DE 4008243 A1 * 9/1991
DE 102007055091 A1 5/2009
(Continued)

OTHER PUBLICATIONS

Keithley Instruments, Inc., Application Note Series, "Testing Dual Airbag Inflators and Modules with the Model 2790 SourceMeter® Switch System," No. 2378, 12 pages, © Copyright 2002.

(Continued)

*Primary Examiner* — Michael J Zanelli
(74) *Attorney, Agent, or Firm* — Kilpatrick Townsend & Stockton LLP; Dean W. Russell; Matthew T. Kitces

(57) ABSTRACT

Described are airbag control units having a radio-frequency identification transceiver, at least one battery pack, at least one inflator driver electrically connected to an airbag module, and one or more processors in communication with the radio-frequency identification transceiver, the battery pack, and the inflator driver. Alternatively, the airbag control unit includes signal conditioning hardware in communication with the radio-frequency identification transceiver, the battery pack, and the inflator driver. The airbag control unit retrieves a signal from the battery pack, analyzes the signal to determine battery status and/or voltage, transmits a signal to the inflator driver to perform an airbag status check, detects and analyzes the signal from the inflator driver to determine a status of the airbag module, and transmits the results to the radio-frequency identification transceiver for communication to a radio-frequency identification reader.

21 Claims, 6 Drawing Sheets

(51) Int. Cl.
*G06F 17/00* (2006.01)
*B60R 21/00* (2006.01)
*B64D 11/06* (2006.01)

(56) References Cited

U.S. PATENT DOCUMENTS

| | | | |
|---|---|---|---|
| 2007/0024463 A1* | 2/2007 | Hall et al. | 340/825.69 |
| 2007/0232164 A1 | 10/2007 | Swan et al. | |
| 2008/0086250 A1* | 4/2008 | Kuivenhoven | 701/45 |
| 2009/0206854 A1* | 8/2009 | Bernardon et al. | 324/713 |
| 2012/0259484 A1 | 10/2012 | Shields et al. | |
| 2012/0259586 A1* | 10/2012 | Shields et al. | 702/183 |

FOREIGN PATENT DOCUMENTS

| | | |
|---|---|---|
| EP | 1306270 A2 | 5/2003 |
| GB | 2433384 A | 6/2007 |
| JP | 2006-228490 * | 8/2006 |

OTHER PUBLICATIONS

Search Report dated Apr. 25, 2013 in European Patent Application No. 13153367.

* cited by examiner

AIRBAG DATA EXCHANGE SYSTEM

CROSS REFERENCE TO RELATED APPLICATION

This application is related to and claims priority benefits from U.S. Provisional Application Ser. No. 61/592,031, filed on Jan. 30, 2012, entitled AIRBAG DATA EXCHANGE SYSTEM (the "'031 application"). The '031 application is hereby incorporated herein in its entirety by this reference.

FIELD OF THE INVENTION

The invention relates to control systems for airbags for passenger seats or the like.

BACKGROUND

In various modes of transportation, passenger seats may be placed behind a structure, such as another row of passenger seats, a bulkhead, a wall, or other structures (commonly referred to as "monuments"). During a minor crash landing, a passenger may be thrown forward so that the passenger's head and/or body strikes these structures due to inertial loads from the event. Typically, these structures are rigid in nature, so as not to provide any energy absorbing or deflecting features. As a result, passengers may experience injuries due to impact with these conventional structural designs.

Airbags have recently been included in the backs and/or seat belts of such seats and in monuments to prevent and/or minimize the degree of such injuries. In many cases, these airbags need to be connected to a control box for system maintenance. During the system maintenance, the battery status and the connection to the inflating mechanism are commonly checked. In most cases, each airbag must be checked individually, which is tedious and time consuming.

Recent developments with wireless communication provides a way to transfer information between the airbag system and a maintenance device. However, to operate properly, the wireless communication system requires external power to ensure data exchange for an extended period of time. It is also possible that the wireless communication system may interfere with aircraft control systems, which otherwise restrict use of wireless communication on aircrafts during flight.

Alternatively, radio-frequency identification labels are commonly used in many industries. Passive transceivers are powered and read at short ranges via magnetic fields (electromagnetic induction) generated by a radio-frequency identification reader. Typically, radio-frequency identification labels transmit mainly static information stored in the radio-frequency identification label without the need for external power. Recent developments in the field of radio-frequency identification now allow bi-directional data transmission between radio-frequency identification readers and transceivers. Also, non-static data, such as sensor signals, may be transferred to a radio-frequency identification reader and new information may be stored in the radio-frequency identification transceiver.

Thus, it may be desirable to provide an airbag control unit that utilizes radio-frequency identification communication to exchange static and dynamic information between a maintenance test unit and an airbag control unit to improve the speed and reliability of airbag system maintenance.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Various embodiments of the invention relate to an airbag control unit comprising a radio-frequency identification transceiver, at least one battery pack, at least one inflator driver electrically connected to an airbag module, and one or more processors in communication with the radio-frequency identification transceiver, the battery pack, and the inflator driver. In other embodiments, the airbag control unit comprises signal conditioning hardware in communication with the radio-frequency identification transceiver, the battery pack, and the inflator driver. In certain embodiments, the airbag control module comprises four inflator drivers.

According to some embodiments, the airbag control unit detects a signal from the radio-frequency identification transceiver, retrieves a signal from the at least one battery pack, analyzes the signal from the at least one battery pack to determine a status and voltage of the at least one battery pack, transmits a signal to the at least one inflator driver commanding the at least one inflator driver to perform an airbag status check of the airbag module, detects a signal from the at least one inflator driver transmitting a result of the airbag status check, analyzes the signal from the at least one inflator driver to determine a status of the airbag module, and transmits the status of the airbag module and the status and voltage of the at least one battery pack to the radio-frequency identification transceiver.

The airbag control unit may return to a sleep mode after transmitting the status of the airbag module and the status and voltage of the at least one battery pack to the radio-frequency identification transceiver.

The airbag control unit may also retrieve a signal from a second battery pack, analyze the signal from the second battery pack to determine a status and voltage of the second battery pack, and transmit the status and voltage of the second battery pack to the radio-frequency identification transceiver.

In certain embodiments, the airbag control unit also retrieves information regarding an operational status of the airbag module from memory, and transmits the operational status of the airbag module to the radio-frequency identification transceiver.

A radio-frequency identification antenna may be electrically coupled to the radio-frequency identification transceiver. A radio-frequency identification reader may be configured to induce power in the radio-frequency identification transceiver, and the radio-frequency identification transceiver may be configured to transmit the status of the airbag module and the status and voltage of the at least one battery pack to the radio-frequency identification reader. The radio-frequency identification transceiver may be further configured to receive and store information transmitted by the radio-frequency identification reader. The information transmitted by the radio-frequency identification reader may comprise at least one of a new battery check date, a new expiration date for at least one inflator, a new identification number for the airbag control unit, and an operational status of the airbag module.

DETAILED DESCRIPTION

Figure 1:
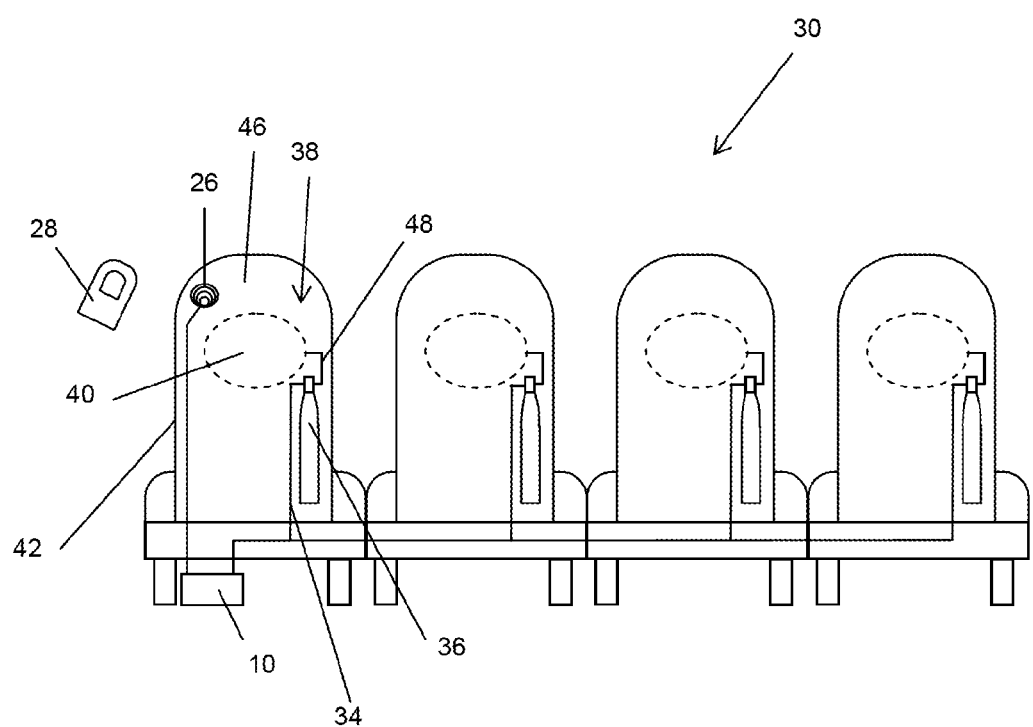
FIG. 1 is a rear view showing a plurality of passenger seats, each seat having an airbag module, and an airbag control unit connected to the airbag module according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide airbag control units for airbag modules mounted on passenger seats. While the airbag control units are discussed for use with aircraft seats, they are by no means so limited. Rather, embodiments of the airbag control units may be used in conjunction with airbag modules with any type of passenger seat, passenger door, or otherwise as desired.

FIGS. 1-5 illustrate embodiments of an airbag control unit ("ACU") 10. In these embodiments, the airbag control unit 10 comprises at least a printed circuit board ("PCB") 12, a controller battery pack 18 supplying power to the circuitry of the PCB 12, and an inflator battery pack 20 supplying power to at least one inflator driver 22. The PCB 12 includes circuitry that comprises at least a microcontroller 14 (or signal conditioning hardware), an acceleration switch, at least one sensor 16, a capacitive buffer 32, at least one inflator driver 22, and a radio-frequency identification ("RFID") transceiver 24. The RFID transceiver 24 also may also include memory that may store static and non-static data and information.

The RFID transceiver 24 is electrically connected to the microcontroller 14 and an RFID antenna 26. An RFID system utilizes a wireless non-contact system based on radio-frequency electromagnetic fields to transfer data between the RFID transceiver 24 and an RFID reader 28 via the RFID antenna 26.

The sensor 16 is positioned on the PCB 12 and may include sensors such as accelerometers, impact sensors, load sensors, and mechanical shock sensors. The sensor 16 may be mounted elsewhere within a vehicle 30 than on the PCB 12.

Software within the microcontroller 14 filters raw signals received from the sensor 16. A software load connector 17 may be included on the PCB 12 to program the software within the microcontroller 14 at the time the ACU 10 or PCB 12 is produced or to introduce upgrades to the software within the microcontroller 14 as needed. Alternatively, signal conditioning hardware may be used in place of the microcontroller 14. In these embodiments, the software load connector 17 is not required.

Figure 2:
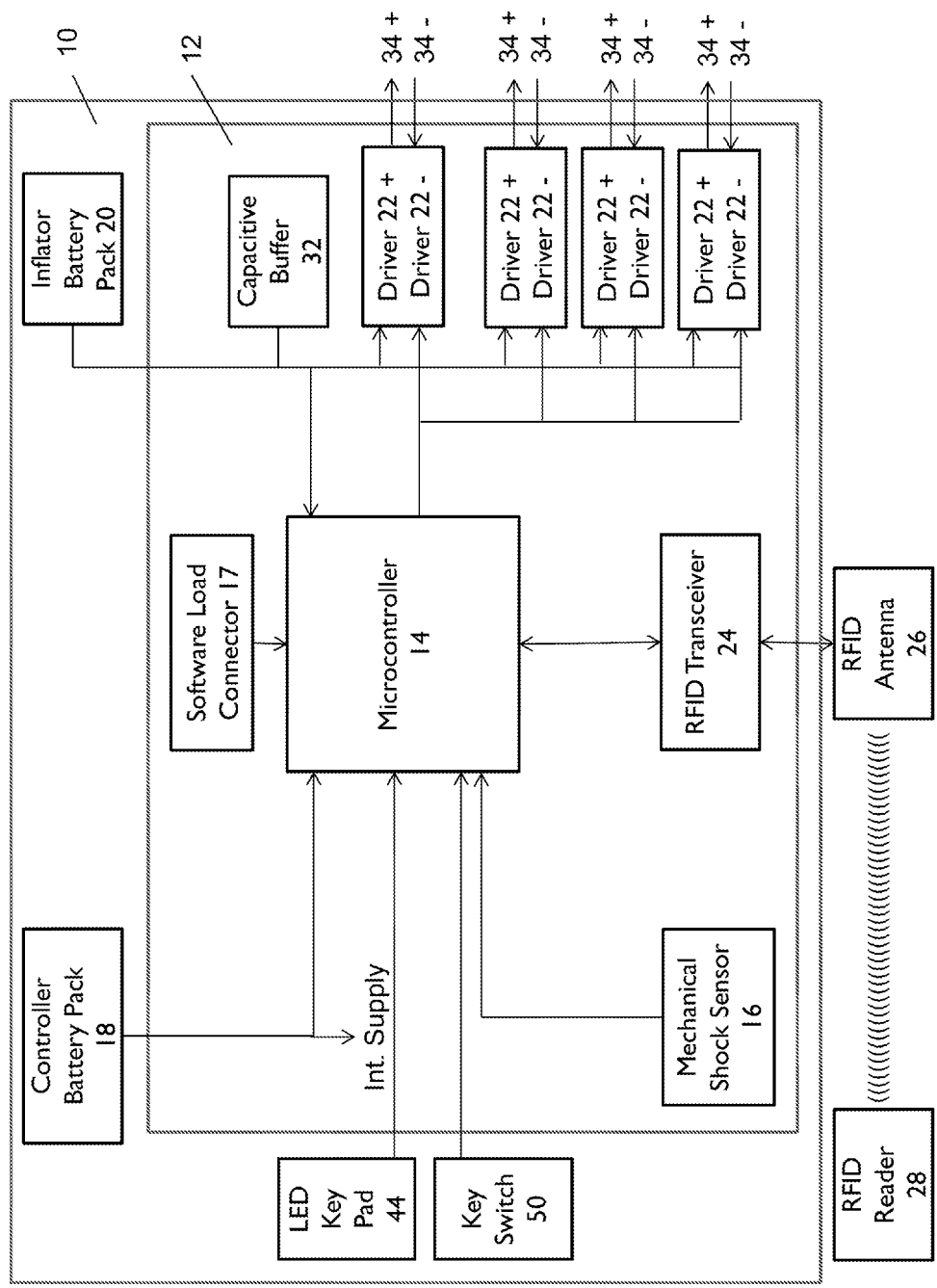
FIG. 2 is a diagram illustrating the airbag control unit of FIG. 1.

According to the embodiments illustrated in FIG. 2, an output from the sensor 16 is electrically connected to the microcontroller 14. Power output from the controller battery pack 18 is electrically connected to circuitry within the PCB 12 to provide power to the circuitry mounted to or embedded within the PCB 12. A signal from the controller battery pack 18 indicating battery status and/or voltage is electrically connected to the microcontroller 14. A signal from the inflator battery pack 20 indicating battery status and/or voltage is also electrically connected to the microcontroller 14.

Power output from the inflator battery pack 20 is switched through the inflator driver 22 to an inflator 36 of an airbag module 38. A pair of connections 34 electrically couple the output of the inflator driver 22 to the inflator 36. In certain embodiments, the power output may be electrically connected to a capacitive buffer 32, wherein an output from the capacitive buffer 32 is electrically connected to the inflator driver 22. The capacitive buffer 32 provides the ability to fire the inflator 36 with a sufficiently high current signal required to ignite the inflator 36 where the current directly from the inflator battery pack 20 may not provide a sufficiently high current signal.

The airbag module 38 comprises at least one airbag 40 and at least one inflator 36. In certain embodiments, the ACU 10 may control up to four airbag modules 38 coupled to four passenger seats 42 in a vehicle 30.

In certain embodiments, the airbag module 38 may need to be disabled for a particular passenger seat 42, such as when a child is seated in the particular passenger seat 42. In some embodiments, the operational status of the airbag module 38 may be controlled through the use of an optional key pad 44 with push buttons and at least one key switch 50. The key pad 44 may be an LED key pad or other suitable key pad design. The flight crew may adjust the key switch 50 from an operational mode to a maintenance mode. In the maintenance mode, the flight crew may use the key pad 44 to change the status of the airbag module 38 from enabled to disabled (and vice versa). Once the status of the airbag module 38 is set, the flight crew switches the key switch 50 back to operational mode. In operational mode, the key switch 50 maintains the last setting that was entered when the key switch 50 was set to maintenance mode. The operational status of each airbag module 38 is stored in memory on the microcontroller 14. Furthermore, in maintenance mode, LEDs may be illuminated to indicate the status of each airbag module 38. The LEDs may be positioned on a surface of the ACU 10 or other suitable locations. Alternatively, the operational status of the airbag module 38 may be controlled directly from the RFID reader 28 without the need for the key switch 50 or the key pad 44.

As best illustrated in FIG. 1, the airbag 40 may be stowed within a passenger seat back 46 in an undeployed state. Suitable locations for stowing the airbag 40 within and/or on the seat back 46 may include potential head or body strike areas. In some embodiments, the airbag 40 may be stowed within a seat belt of the passenger seat 42. As illustrated in FIG. 1, a gas hose 48 may be coupled to the airbag 40 and to the inflator 36.

The inflator 36 may be a high pressure gas vessel comprising a gas that rapidly inflates the airbag 40 within the required time period.

A current pulse of at least 1 ampere for a duration of at least 2 milliseconds is passed from the inflator driver 22 through the pair of connections 34, wherein the pair of connections 34 may be coupled to an electro-explosive device, such as a bridgewire, squib, initiator, ignitor, or electric match, that translates an electrical signal into a pyrotechnic signal to initiate the release of gas by the inflator 36.

Figure 3:
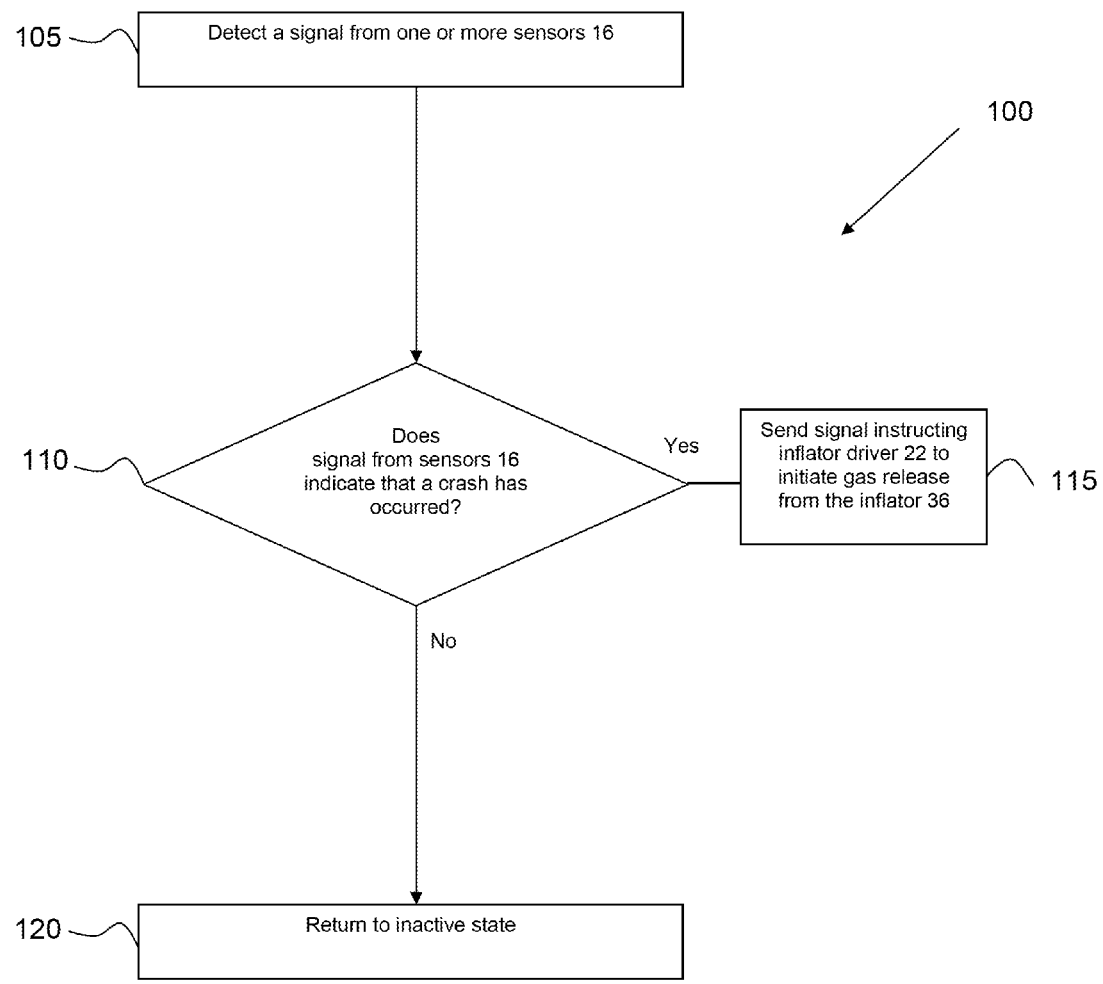
FIG. 3 is a simplified flow diagram illustrating deployment of an airbag module by the airbag control unit of FIG. 1.

According to these embodiments, the airbag module 38 may be controlled via a control system 100, which is illustrated in a simplified flow diagram shown in FIG. 3. The control system 100 may include processing logic that may comprise hardware (circuitry, dedicated logic, etc.), software (such as is run on a general purpose computing system or a dedicated machine), firmware (embedded software), or any combination thereof.

At step 105, the microcontroller 14 detects a signal from one or more of the sensors 16.

At step 110, the microcontroller 14 decides whether the signal from the sensors 16 indicates that a crash has occurred. If so, at step 115, the microcontroller 14 transmits a signal to the inflator driver 22 to initiate gas release from the inflator 36. When the inflator driver 22 detects the signal, the inflator driver 22 sends an electrical current through the pair of connections 34 at the appropriate amperage and duration to initiate the inflator 36 and inflate the airbag 40. If not, at step 120, the ACU 10 returns to an inactive state or "sleep mode", and power consumption of the ACU 10 is set to a minimum.

In certain embodiments, prior to step 115, the microcontroller 14 may check to see whether the operational status of the airbag module 38 has been changed to disable the airbag module 38. To check the operational status of the airbag module 38, the microcontroller 14 retrieves information regarding the operational status of the airbag module 38 previously stored in memory on the microcontroller 14. If the ACU 10 is connected to more than one airbag module 38, the microcontroller 14 may check to see whether the operational status of each airbag module 38 has been changed to disable the airbag module 38. The microcontroller 14 then proceeds with step 115 described above for each airbag module 38 that is enabled.

Figure 4:
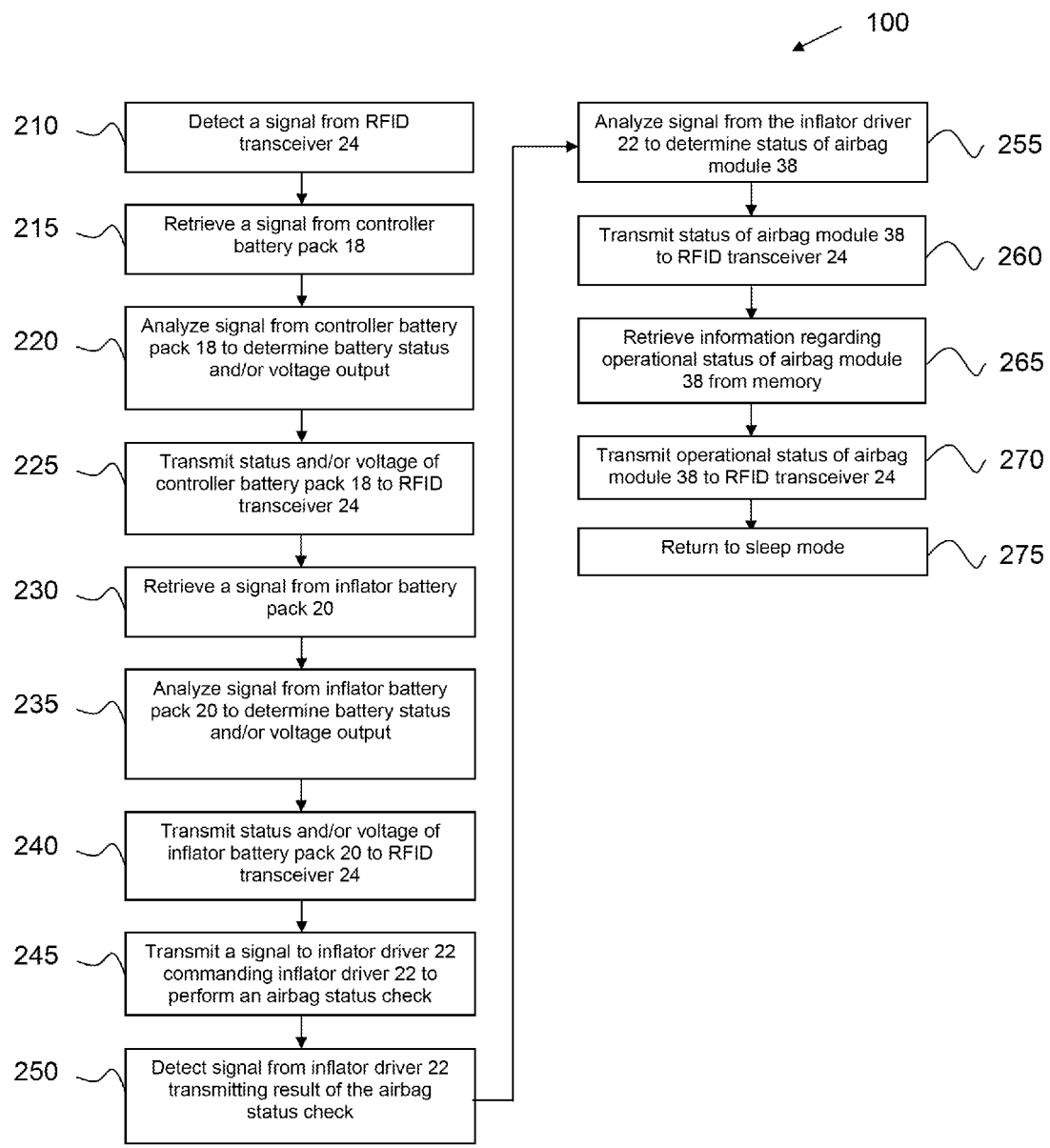
FIG. 4 is a simplified flow diagram illustrating an inspection method performed relative to a microprocessor of the airbag control unit of FIG. 1.
Figure 5:
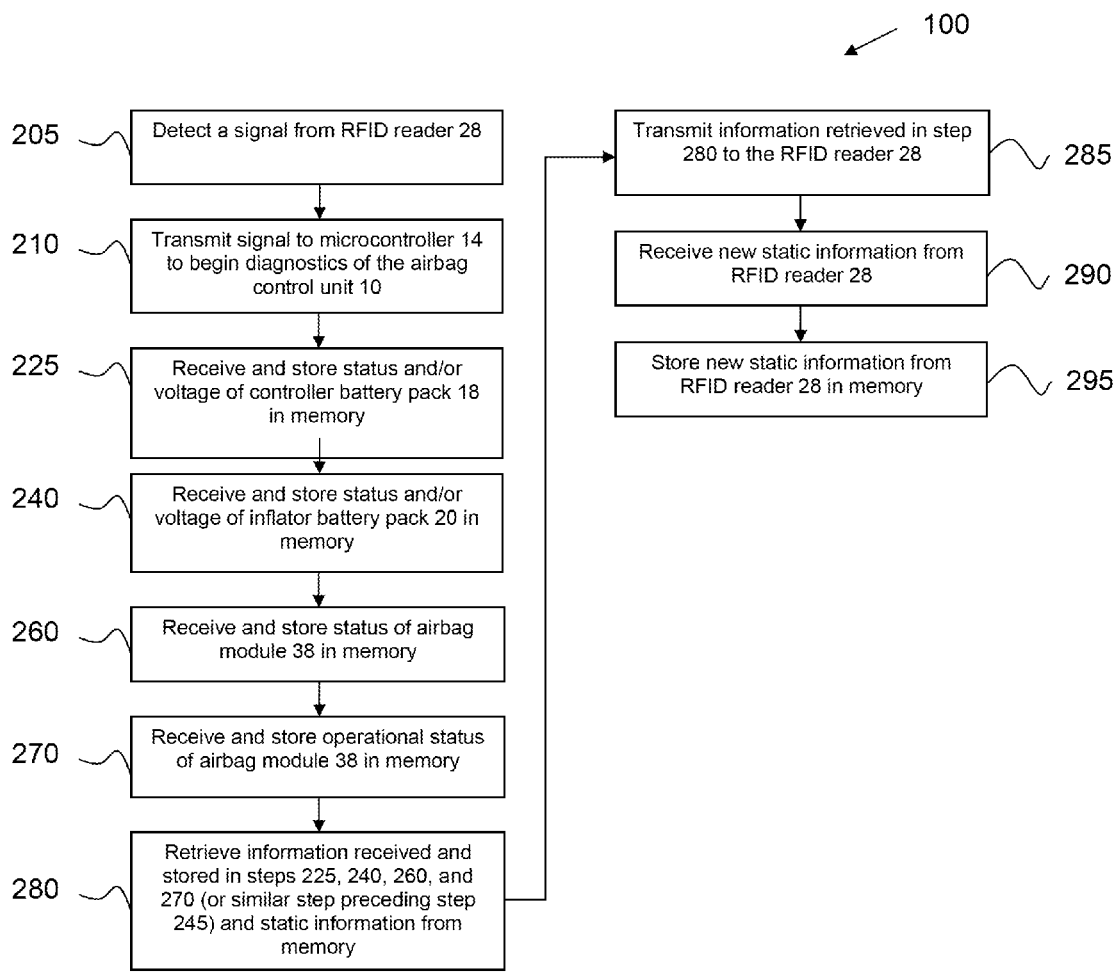
FIG. 5 is a simplified flow diagram illustrating an inspection method performed relative to an RFID transceiver of the airbag control unit of FIG. 1.

According to these embodiments, system maintenance may be performed on the airbag control unit 10 via a series of steps executed in the control system 100, which is illustrated in simplified flow diagrams shown in FIGS. 4-5. FIG. 4 includes the steps that are performed relative to the microprocessor 14 or signal conditioning hardware, and FIG. 5 includes the steps that are performed relative to the RFID transceiver 24.

At step 205, the RFID reader 28 powers the RFID transceiver 24 by inducing power in the RFID transceiver 24 via the RFID antenna 26 and prompts the RFID transceiver 24 to contact the microcontroller 14 to begin diagnostics of the airbag control unit 10. The RFID transceiver 24 is powered and read at short ranges via magnetic fields (electromagnetic induction) generated by the RFID reader 28. Because the RFID transceiver 24 operates without a battery (passive), the RFID transceiver 24 may be less expensive, smaller, and may operate indefinitely without maintenance and/or replacement. The transmission range of the RFID transceiver 24 may be less than those RFID devices with a battery (active). However, one of ordinary skill in the art will understand that the RFID transceiver 24 may be an active device and the RFID reader 28 may be a passive device, or both may be active devices.

At step 210, the RFID transceiver 24 transmits a signal to the microcontroller 14, awakening the microcontroller 14 from a sleep mode. Upon being awakened by the RFID transceiver 24, the microcontroller 14 begins performing diagnostics of the airbag control unit 10.

At step 215, the microcontroller 14 retrieves a signal from the controller battery pack 18.

At step 220, the microcontroller 14 analyzes the signal from the controller battery pack 18 to determine whether the controller battery pack 18 passes a status check (i.e., the signal is greater than a threshold value set to rate the quality of the battery, such as 7.5 volts) and/or to determine the actual voltage output of the controller battery pack 18.

At step 225, the microcontroller 14 transmits the status and/or voltage of the controller battery pack 18 to the RFID transceiver 24, where the information may be stored in memory on the RFID transceiver 24.

At step 230, the microcontroller 14 retrieves a signal from the inflator battery pack 20.

At step 235, the microcontroller 14 analyzes the signal from the inflator battery pack 20 to determine whether the inflator battery pack 20 passes a status check (i.e., the signal is greater than a threshold value set to rate the quality of the battery, such as 7.5 volts) and/or to determine the actual voltage output of the inflator battery pack 20.

At step 240, the microcontroller 14 transmits the status and/or voltage of the inflator battery pack 20 to the RFID transceiver 24, where the information is stored in memory on the RFID transceiver 24.

In certain embodiments, prior to step 245, the microcontroller 14 may check to see whether the operational status of the airbag module 38 has been changed to disable the airbag module 38. To check the operational status of the airbag module 38, the microcontroller 14 retrieves information regarding the operational status of the airbag module 38 previously stored in memory on the microcontroller 14. If the ACU 10 is connected to more than one airbag module 38, the microcontroller 14 may check to see whether the operational status of each airbag module 38 has been changed to disable the airbag module 38. The microcontroller 14 may transmit the operational status of airbag module 38 to the RFID transceiver 24, where the information is stored in memory on the RFID transceiver 24. The microcontroller 14 may omit steps 245-260 below for each airbag module 38 that is disabled.

At step 245, the microcontroller 14 transmits a signal to the inflator driver 22 commanding the inflator driver 22 to perform an airbag status check. When the inflator driver 22 detects the signal, the inflator driver 22 sends an electrical current through the pair of connections 34 at a sufficiently low amperage and duration so as not to initiate the inflator 36, but to confirm that the electrical current successfully passes through the pair of connections 34 and returns to the inflator driver 22.

At step 250, the microcontroller 14 detects a signal from the inflator driver 22 transmitting the result of the airbag status check.

At step 255, the microcontroller 14 analyzes the signal from the inflator driver 22 to determine whether the inflator battery pack 20 passes the airbag status check (i.e., the circuit is closed between the pair of connections 34 so that the electrical current is returned to the inflator driver 22.

At step 260, the microcontroller 14 transmits the status of the airbag module 38 to the RFID transceiver 24, where the information is stored in memory on the RFID transceiver 24.

Alternatively, if the steps to detect the operational status of each airbag module 38 are not performed prior to step 245, then at step 265, the microcontroller 14 may check to see whether the operational status of the airbag module 38 has been changed to disable the airbag module 38. To check the operational status of the airbag module 38, the microcontroller 14 retrieves information regarding the operational status of the airbag module 38 previously stored in memory on the microcontroller 14. If the ACU 10 is connected to more than one airbag module 38, the microcontroller 14 may check to see whether the operational status of each airbag module 38 has been changed to disable the airbag module 38. At step 270, the microcontroller 14 may transmit the operational status of the airbag module 38 to the RFID transceiver 24, where the information is stored in memory on the RFID transceiver 24.

At step 275, the microcontroller 14 returns to a sleep mode and power consumption of the ACU 10 is set to a minimum.

At step 280, the RFID transceiver 24 retrieves from memory some and/or all of the information received from the microcontroller 14 at steps 225, 240, 260, and 270 (or similar optional step preceding step 245), and may also retrieve static information from memory, including but not limited to a date of the last battery check, an expiration date of each inflator 36, and an identification number of the ACU 10.

At step 285, the RFID transceiver 24 transmits the information retrieved in step 280 to the RFID reader 28 via the RFID antenna 26. The information may be displayed on a screen of the RFID reader 28 and/or stored within the RFID reader 28 or a storage device that is connected to the RFID reader 28.

At step 290, the RFID reader 28 may transmit information to the RFID transceiver 24 to replace some and/or all of the previously stored information, including but not limited to a new battery check date, a new expiration date for each inflator 36 (if the inflator 36 is replaced as part of the maintenance work), a new identification number for the ACU 10 (if needed), and updated information on the operational status of airbag modules 38 to update and/or override the information on the operational status of the airbag modules 38 previously stored in memory, which may be used in place of steps 265-270 (or similar optional steps preceding step 245).

At step 295, the RFID transceiver 24 stores the newly transmitted static information from the RFID reader 28 in memory on the RFID transceiver 24 in place of some or all of the previously stored static information.

One of ordinary skill in the relevant art will understand that the information collected and/or analyzed by the microcontroller 14 at steps 220, 235, 255, and 265 (or similar optional step preceding step 245), as well as the static information described in steps 280 and 295 may be stored in memory located on the PCB 12, may be stored locally in memory on the RFID reader 28, may transmitted to a storage device connected to the RFID reader 28 (not shown), and/or may be forwarded to an indication panel or monitor 450 to display the status of all airbag modules 38 on the aircraft to the flight crew via a computer apparatus 400.

Figure 6:
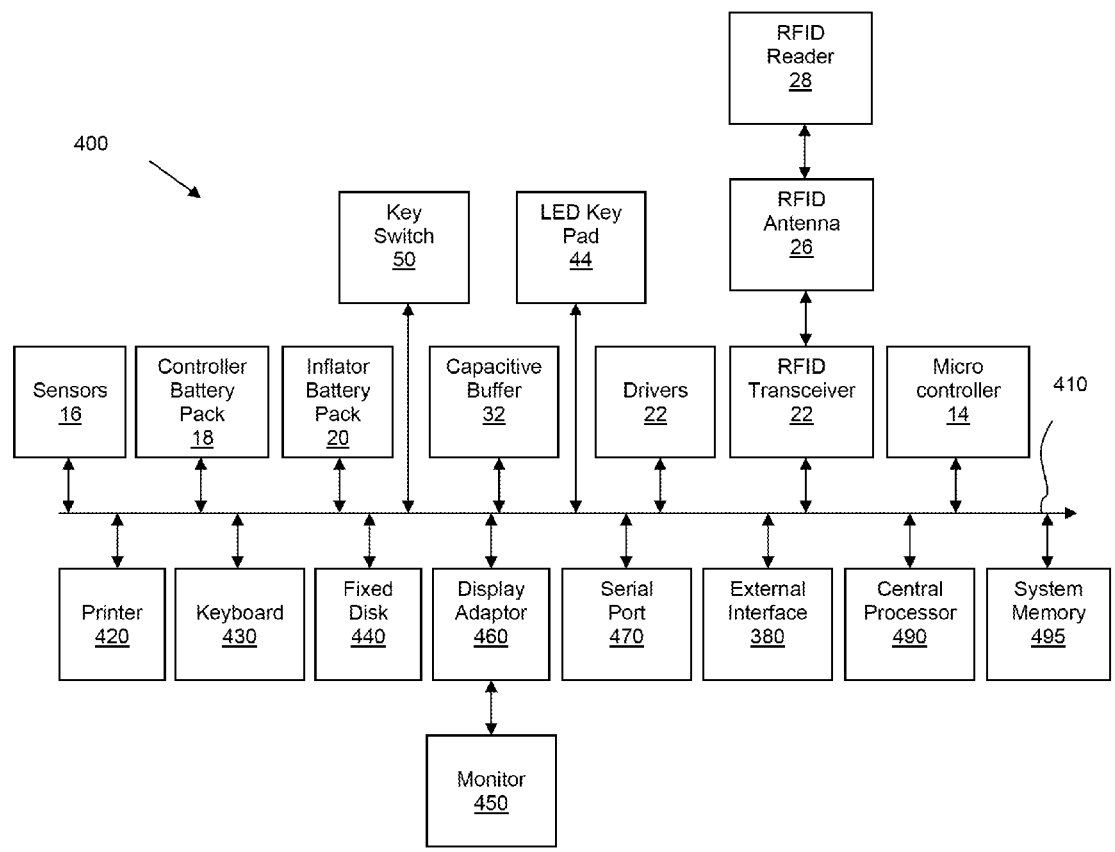
FIG. 6 is diagram of a computer system apparatus for the airbag control unit of FIG. 1.

FIG. 6 is a diagram of the computer apparatus 400, according to certain exemplary embodiments. The various participants and elements in the previously described system diagrams (e.g., the ACU 10 in FIGS. 1-3) may use any suitable number of subsystems in the computer apparatus 400 to facilitate the functions described herein. Examples of such subsystems or components are shown in FIG. 2. The subsystems or components shown in FIG. 2 may be interconnected via a system bus 410 or other suitable connection. In addition to the subsystems described above, additional subsystems such as a printer 420, keyboard 430, fixed disk 440 (or other memory comprising computer-readable media), monitor 450, which is coupled to a display adaptor 460, and others are shown. Peripherals and input/output (I/O) devices (not shown), which couple to the microcontroller 14, can be connected to the system 100 by any number of means known in the art, such as a serial port 470. For example, the serial port 470 or an external interface 480 may be used to connect the control system 100 to a wide area network such as the Internet, a mouse input device, or a scanner. The interconnection via the system bus 410 allows a central processor 490 to communicate with each subsystem and to control the execution of instructions from a system memory 495 or the fixed disk 440, as well as the exchange of information between subsystems. The system memory 495 and/or the fixed disk 440 may embody a computer-readable medium.

The software components or functions described in this application may be implemented via programming logic controllers ("PLCs"), which may use any suitable PLC programming language. In other embodiments, the software components or functions described in this application may be implemented as software code to be executed by one or more processors using any suitable computer language such as, for example, Java, C++ or Perl using, for example, conventional or object-oriented techniques. The software code may be stored as a series of instructions or commands on a computer-readable medium, such as a random access memory ("RAM"), a read-only memory ("ROM"), a magnetic medium such as a hard-drive or a floppy disk, or an optical medium such as a CD-ROM. Any such computer-readable medium may also reside on or within a single computational apparatus, and may be present on or within different computational apparatuses within a system or network.

The invention can be implemented in the form of control logic in software or hardware or a combination of both. The control logic may be stored in an information storage medium as a plurality of instructions adapted to direct an information processing device to perform a set of steps disclosed in embodiments of the invention. Based on the disclosure and teachings provided herein, a person of ordinary skill in the art will appreciate other ways and/or methods to implement the invention.

In embodiments, any of the entities described herein may be embodied by a computer that performs any or all of the functions and steps disclosed.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. An airbag control unit comprising:
(a) a radio-frequency identification transceiver for transmitting a first signal in response to receiving a first wireless transmission;
(b) at least one battery pack;
(c) at least one inflator driver electrically connected to an airbag module;
(d) one or more processors in communication with the radio-frequency identification transceiver, the at least one battery pack, a capacitive buffer, and the at least one inflator driver; and
(e) memory including instructions that, when executed by the one or more processors, cause the one or more processors to:
   detect the first signal from the radio-frequency identification transceiver;
   retrieve a signal from the at least one battery pack;
   analyze the signal from the at least one battery pack to determine a status and voltage of the at least one battery pack;

transmit a signal to the at least one inflator driver commanding the at least one inflator driver to perform an airbag status check of the airbag module;

detect a signal from the at least one inflator driver transmitting a result of the airbag status check;

analyze the signal from the at least one inflator driver to determine a status of the airbag module; and transmit the status of the airbag module and the status and voltage of the at least one battery pack to the radio-frequency identification transceiver, wherein the radio-frequency identification transceiver is capable of transmitting a second wireless transmission based on the status of the airbag module and the status and voltage of the at least one battery pack.

2. The airbag control unit of claim 1, wherein the instructions, when executed by the one or more processors, cause the one or more processors to:

return to a sleep mode after transmitting the status of the airbag module and the status and voltage of the at least one battery pack to the radio-frequency identification transceiver.

3. The airbag control unit of claim 1, further comprising a second battery pack, wherein the instructions, when executed by the one or more processors, cause the one or more processors to:

retrieve a signal from the second battery pack;

analyze the signal from the second battery pack to determine a status and voltage of the second battery pack; and transmit the status and voltage of the second battery pack to the radio-frequency identification transceiver, wherein the radio-frequency identification transceiver is capable of transmitting the second wireless transmission based additionally on the status and voltage of the second battery pack.

4. The airbag control unit of claim 1, further comprising at least one key switch and an optional key pad for controlling an operational status of the airbag module, wherein the instructions, when executed by the one or more processors, cause the one or more processors to:

retrieve information regarding the operational status of the airbag module from memory; and transmit the operational status of the airbag module to the radio-frequency identification transceiver, wherein the radio-frequency identification transceiver is capable of transmitting the second wireless transmission based additionally on the operational status of the airbag module.

5. The airbag control unit of claim 1, further comprising a radio-frequency identification antenna electrically coupled to the radio-frequency identification transceiver.

6. The airbag control unit of claim 5, wherein the radio-frequency identification transceiver is configured to have power induced therein by a radio-frequency identification reader, and wherein the radio-frequency identification transceiver is configured to wirelessly transmit at least the status of the airbag module and the status and voltage of the at least one battery pack to the radio-frequency identification reader.

7. The airbag control unit of claim 6, wherein the radio-frequency identification transceiver is further configured to wirelessly receive and store information transmitted by the radio-frequency identification reader.

8. The airbag control unit of claim 7, wherein the information comprises at least one of a new battery check date, a new expiration date for at least one inflator, a new identification number for the airbag control unit, and an operational status of the airbag module.

9. The airbag control unit of claim 1, further comprising four inflator drivers.

10. A method of analyzing an airbag control unit, the airbag control unit comprising a radio-frequency identification transceiver for transmitting a first signal in response to receiving a first wireless transmission, at least one battery pack, a capacitive buffer, and at least one inflator driver electrically connected to an airbag module, the method comprising:

detecting the first signal from the radio-frequency identification transceiver;

retrieving a signal from the at least one battery pack;

analyzing the signal from the at least one battery pack to determine a status and voltage of the at least one battery pack;

transmitting a signal to the at least one inflator driver commanding the at least one inflator driver to perform an airbag status check of the airbag module;

detecting a signal from the at least one inflator driver transmitting a result of the airbag status check;

analyzing the signal from the at least one inflator driver to determine a status of the airbag module; and transmitting the status of the airbag module and the status and voltage of the at least one battery pack to the radio-frequency identification transceiver, wherein the radio-frequency identification transceiver is capable of transmitting a second wireless transmission based on the status of the airbag module and the status and voltage of the at least one battery pack.

11. The method of claim 10, wherein the method further comprises: returning to a sleep mode after transmitting the status of the airbag module and the status and voltage of the at least one battery pack to the radio-frequency identification transceiver.

12. The method of claim 10, further comprising at least one key switch and an optional key pad for controlling an operational status of the airbag module, wherein the method further comprises:

retrieving information regarding the operational status of the airbag module from memory; and transmitting the operational status of the airbag module to the radio-frequency identification transceiver, wherein the radio-frequency identification transceiver is capable of transmitting the second wireless transmission based additionally on the status and voltage of the second battery pack.

13. The method of claim 10, wherein the radio-frequency identification transceiver is configured to wirelessly transmit the status of the airbag module and the status and voltage of the at least one battery pack to a radio-frequency identification reader and to wirelessly receive information transmitted by the radio-frequency identification reader.

14. The method of claim 13, further comprising:

detecting the information wirelessly transmitted by the radio-frequency identification reader; and storing the information in memory.

15. The method of claim 14, wherein the information transmitted by the radio-frequency identification reader comprises at least one of a new battery check date, a new expiration date for at least one inflator, a new identification number for the airbag control unit, and an operational status of the airbag module.

16. A method of analyzing an airbag control unit, the airbag control unit comprising a radio-frequency identification transceiver for transmitting a first signal in response to receiving a first wireless transmission, a controller battery pack, a capacitive buffer, an inflator battery pack, and at least one inflator driver electrically connected to an airbag module, the method comprising:
    detecting the first signal from the radio-frequency identification transceiver;
    retrieving a signal from the controller battery pack;
    analyzing the signal from the controller battery pack to determine a status and voltage of the controller battery pack;
    retrieving a signal from the inflator battery pack;
    analyzing the signal from the inflator battery pack to determine a status and voltage of the inflator battery pack;
    transmitting a signal to the at least one inflator driver commanding the at least one inflator driver to perform an airbag status check of the airbag module;
    detecting a signal from the at least one inflator driver transmitting a result of the airbag status check;
    analyzing the signal from the at least one inflator driver to determine a status of the airbag module; and
    transmitting the status of the airbag module and the status and voltage of the controller battery pack and the inflator battery pack to the radio-frequency identification transceiver, wherein the radio-frequency identification transceiver is capable of transmitting a second wireless transmission based on the status of the airbag module and the status and voltage of the controller battery pack and the inflator battery pack.

17. The method of claim 16, further comprising at least one key switch and an optional key pad for controlling an operational status of the airbag module, wherein the method further comprises:
    retrieving information regarding the operational status of the airbag module from memory; and
    transmitting the operational status of the airbag module to the radio-frequency identification transceiver, wherein the radio-frequency identification transceiver is capable of transmitting the second wireless transmission based additionally on the operational status of the airbag module.

18. The method of claim 16, wherein the radio-frequency identification transceiver is configured to wirelessly transmit the status of the airbag module and the status and voltage of the controller battery pack and the inflator battery pack to a radio-frequency identification reader and to wirelessly receive information transmitted by the radio-frequency identification reader.

19. The method of claim 18, further comprising:
    detecting the information wirelessly transmitted by the radio-frequency identification reader; and
    storing the information in memory.

20. The method of claim 19, wherein the information transmitted by the radio-frequency identification reader comprises at least one of a new battery check date, a new expiration date for at least one inflator, a new identification number for the airbag control unit, and an operational status of the airbag module.

21. An airbag control unit comprising:
(a) a radio-frequency identification transceiver for transmitting a first signal in response to receiving a first wireless transmission;
(b) at least one battery pack;
(c) at least one inflator driver electrically connected to an airbag module;
(d) signal conditioning hardware in communication with the radio-frequency identification transceiver, the at least one battery pack, a capacitive buffer, and the at least one inflator driver;
wherein the airbag control unit is configured to:
    detect the first signal from the radio-frequency identification transceiver;
    retrieve a signal from the at least one battery pack;
    analyze the signal from the at least one battery pack to determine a status and voltage of the at least one battery pack;
    transmit a signal to the at least one inflator driver commanding the at least one inflator driver to perform an airbag status check of the airbag module;
    detect a signal from the at least one inflator driver transmitting a result of the airbag status check;
    analyze the signal from the at least one inflator driver to determine a status of the airbag module; and
    transmit the status of the airbag module and the status and voltage of the at least one battery pack to the radio-frequency identification transceiver, wherein the radio-frequency identification transceiver is capable of transmitting a second wireless transmission based on the status of the airbag module and the status and voltage of the at least one battery pack.

* * * * *